United States Patent
Cabillic et al.

(10) Patent No.: US 8,516,496 B2
(45) Date of Patent: Aug. 20, 2013

(54) STORING CONTEXTS FOR THREAD SWITCHING

(75) Inventors: Gilbert Cabillic, Brece (FR); Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 1966 days.

(21) Appl. No.: 11/186,315

(22) Filed: Jul. 21, 2005

(65) Prior Publication Data

US 2006/0026390 A1  Feb. 2, 2006

(30) Foreign Application Priority Data

Jul. 27, 2004 (EP) .................................. 04291918

(51) Int. Cl.
*G06F 9/46* (2006.01)
*G06F 15/00* (2006.01)

(52) U.S. Cl.
USPC .......................................... 718/108; 712/200

(58) Field of Classification Search
USPC .......................................... 718/108; 712/200
See application file for complete search history.

(56) References Cited

U.S. PATENT DOCUMENTS

| | | | | |
|---|---|---|---|---|
| 5,142,677 A * | 8/1992 | Ehlig et al. | ..................... | 718/108 |
| 5,390,329 A * | 2/1995 | Gaertner et al. | .............. | 718/108 |
| 5,490,272 A * | 2/1996 | Mathis et al. | .................. | 718/108 |
| 5,530,870 A * | 6/1996 | De Bruler | ..................... | 717/155 |
| 5,634,046 A * | 5/1997 | Chatterjee et al. | ............. | 712/227 |
| 6,061,711 A * | 5/2000 | Song et al. | .................... | 718/108 |
| 7,380,039 B2 * | 5/2008 | Miloushev et al. | ........... | 710/244 |
| 7,610,473 B2 * | 10/2009 | Kissell | ........................... | 712/235 |
| 7,631,307 B2 * | 12/2009 | Wang et al. | ................... | 718/100 |

* cited by examiner

*Primary Examiner* — Camquy Truong
(74) *Attorney, Agent, or Firm* — Ronald O. Neerings; Wade James Brady, III; Frederick J. Telecky, Jr.

(57) ABSTRACT

An electronic device comprising decode logic that decodes instructions and a stack coupled to the decode logic. A group of instructions causes the decode logic to push onto the stack, after halting processing of a first thread at a switch point and prior to processing a second thread, a minimum amount of information needed to resume execution of the first thread at the switch point and not information not needed to resume execution of the first thread at the switch point.

14 Claims, 4 Drawing Sheets

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | GENERAL PURPOSE (GP) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE (GP) |
| R9 | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

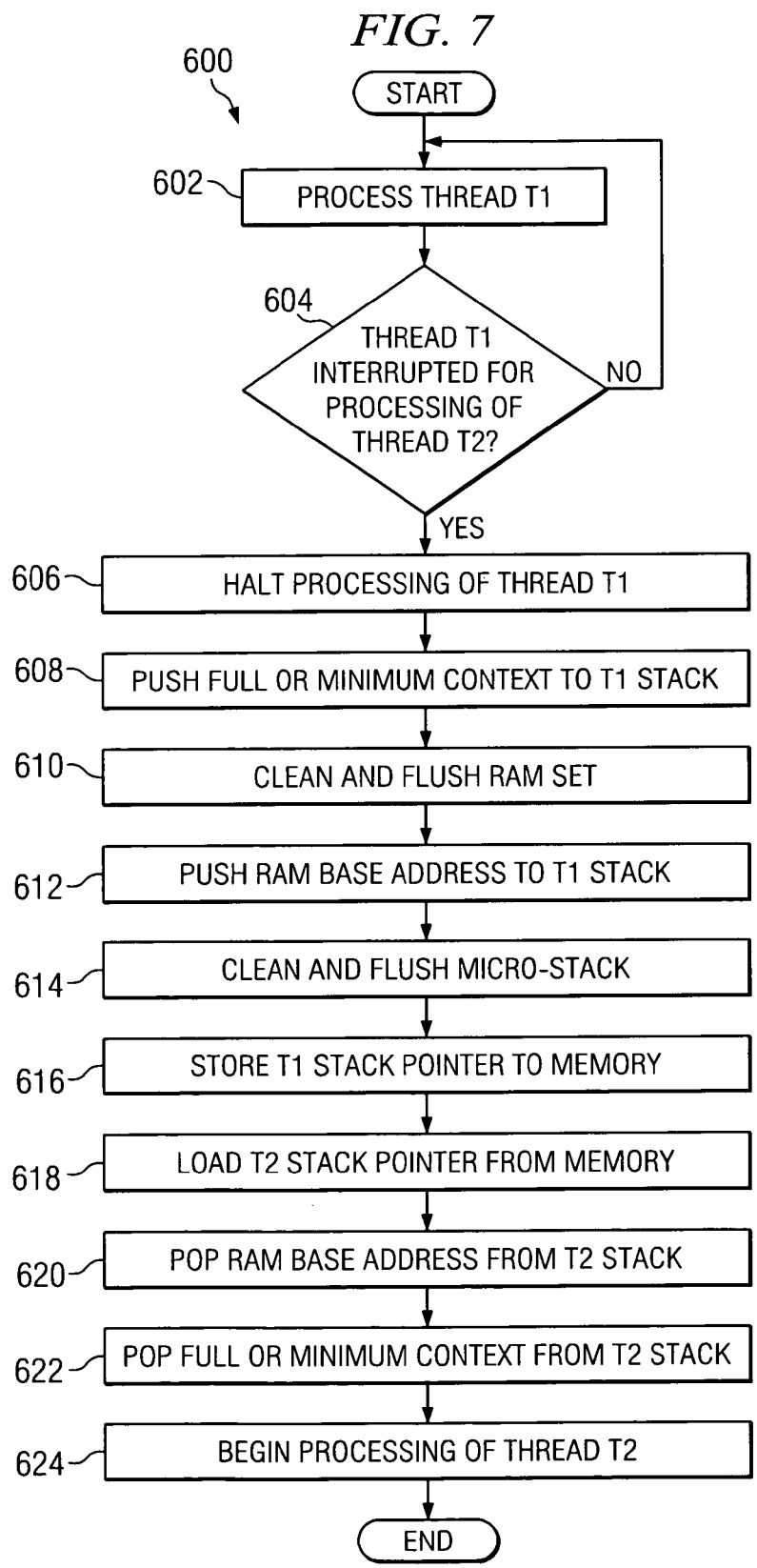

STORING CONTEXTS FOR THREAD SWITCHING

CROSS-REFERENCE TO RELATED APPLICATIONS

This application claims priority to European Patent Application No. 04291918.3, filed on Jul. 27, 2004 and incorporated herein by reference.

BACKGROUND

In the context of software code, a "thread" may be defined as a single stream of code execution. While executing a software program, a processor may switch from a first thread to a second thread in order to complete a particular task. For example, the first thread may comprise some stimulus (i.e., instruction) that, when executed by the processor, causes the processor to halt execution of the first thread and to begin execution of the second thread. The second thread may comprise the performance of some task by a different portion of the software program.

The point in the first thread at which the switch is made may be termed the "switch point." When switching from the first thread to the second thread, the processor first "bookmarks" the switch point, so that when the processor has finished executing the second thread of code, it can resume execution in the first thread at the switch point.

In order to bookmark the switch point, the processor stores all information that pertains to the switch point (known as the "context" of the switch point). Such information includes all registers, the program counter, pointer to the stack, etc. The processor copies such information to memory and retrieves the information later to resume execution in the first thread at the switch point. Bookmarking the switch point is time-consuming and consumes power which may be in limited supply in, for example, a battery-operated device such as a mobile phone.

BRIEF SUMMARY

Disclosed herein is a technique for switching threads by storing (i.e., bookmarking) switch point contexts. An illustrative embodiment comprises an electronic device comprising decode logic that decodes instructions and a stack coupled to the decode logic. A group of instructions causes the decode logic to push onto the stack, after halting processing of a first thread at a switch point and prior to processing a second thread, a minimum amount of information needed to resume execution of the first thread at the switch point and not information not needed to resume execution of the first thread at the switch point.

Another illustrative embodiment comprises a processor comprising a decode logic adapted to decode instructions retrieved from memory, where the decode logic comprises first and second program counters. Prior to switching from a first thread to a second thread at a switch point, the decode logic pushes onto a stack only the first program counter, the second program counter, the status of the processor and a register.

Yet another illustrative embodiment comprises a method for switching from a first thread of a software program to a second thread. The method comprises halting the processing of the first thread at a switch point, pushing values onto a stack, where the values are selected from registers used by the software program, pushing a memory base address onto the stack, and storing a stack pointer to memory, where the stack pointer is indicative of the address of a topmost entry of the stack.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 7 shows a flow diagram of the switching process of FIG. 5, in accordance with embodiments of the invention.

DETAILED DESCRIPTION OF THE PREFERRED EMBODIMENTS

Figure 1:
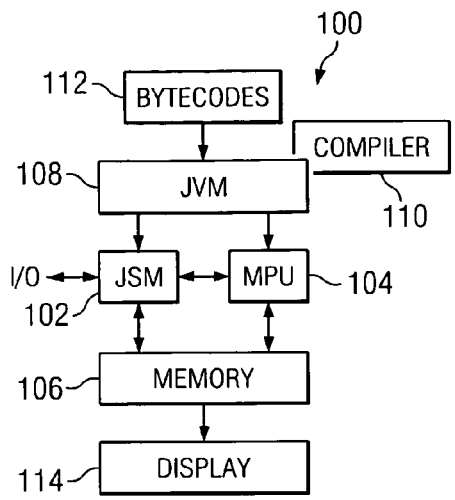
FIG. 1 shows a diagram of a system in accordance with preferred embodiments of the invention and including a Java Stack Machine ("JSM") and a Main Processor Unit ("MPU"), in accordance with embodiments of the invention.

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Processors that store to memory all information pertaining to the switch point unnecessarily spend time and power doing so. Whereas the aforementioned processors store all registers, the program counter, stack pointer, etc., the subject matter described herein is achieved at least in part by the realization that in many cases, fewer than all such information need be stored. For example, only three values are saved to sufficiently bookmark the switch point: the program counter (PC), a second program counter called the micro-program counter (μPC), discussed below, and a status register. Once the processor has finished executing the second thread, these three values provide sufficient information for the processor to find the switch point in the first thread and resume execution at that switch point.

Accordingly, described herein is a programmable electronic device, such as a processor, that is able to bookmark a switch point using a minimal amount of information pertaining to the switch point. A "minimal" amount of information generally comprises information in one or more registers, but not all registers, of a processor core. For example, in some embodiments, a "minimal" amount of information comprises a PC register, a μPC register and a status register. In other embodiments, a "minimal" amount of information comprises the PC register, the μPC register and the status register, as well as one or more additional registers, but less than all registers. In still other embodiments, a "minimal" amount of information comprises less than all registers. In yet other embodiments, a "minimal" amount of information consists of only the information (i.e., registers) necessary to bookmark a switch point, where the amount of information (i.e., number of registers) varies depending on the processor used and/or the software application being processed. In such cases, the "minimal" amount of information may simply be one register or may be all of the registers in the processor core. Instead of storing all switch point information to memory, the processor described herein pushes a minimal amount of switch point information onto a processor stack. Later, when the processor needs the switch point information, it pops the information off of the stack and uses the information to resume execution at the switch point. In this way, the time and power demands placed on the processor are reduced or even minimized, resulting in increased performance.

Some situations, however, require more than a minimal amount of information to be stored. For example, in these situations, a minimum amount of information may not be sufficient to properly bookmark a switch point. Accordingly, the disclosed processor is capable of bookmarking a switch point using a minimal amount of information ("minimal context store") needed to resume execution at the switch point. The processor also is capable of bookmarking a switch point using more than a minimal amount of information ("full context store"), as described further below.

The processor described herein is particularly suited for executing Java™ Bytecodes or comparable code. As is well known, Java is particularly suited for embedded applications. Java is a stack-based language, meaning that a processor stack is heavily used when executing various instructions (e.g., Bytecodes), which instructions generally have a size of 8 bits. Java is a relatively "dense" language meaning that on average each instruction may perform a large number of functions compared to other instructions. The dense nature of Java is of particular benefit for portable, battery-operated devices that preferably include as little memory as possible to save space and power. The reason, however, for executing Java code is not material to this disclosure or the claims which follow. Further, the processor advantageously includes one or more features that permit the execution of the Java code to be accelerated.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The MPU 104 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired for various applications.

As is generally well known, Java code comprises a plurality of "Bytecodes" 112. Bytecodes 112 may be provided to the JVM 108, compiled by compiler 1 10 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown) which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two types of instruction sets. One type of instruction set may comprise standard Java Bytecodes. As is well-known, Java is a stack-based programming language in which instructions generally target a stack. For example, an integer add ("IADD") Java instruction pops two integers off the top of the stack, adds them together, and pushes the sum back on the stack. A "simple" Bytecode instruction is generally one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structure for various verifications (e.g., NULL pointer, array boundaries). As will be described in further detail below, one or more of the complex Bytecodes may be replaced by a "micro-sequence" comprising various other instructions.

Another type of instruction set executed by the JSM 102 may include instructions other than standard Java instructions. In accordance with at least some embodiments of the invention, the other instruction set may include register-based and memory-based operations to be performed. This other type of instruction set generally complements the Java instruction set and, accordingly, may be referred to as a complementary instruction set architecture ("C-ISA"). By complementary, it is meant that a complex Java Bytecode may be replaced by a "micro-sequence" comprising C-ISA instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java Bytecodes combined with a register-based architecture for executing register and memory based C-ISA instructions. Both architectures preferably are tightly combined and integrated through the C-ISA. Because various of the data structures described herein are generally JVM-dependent and thus may change from one JVM implementation to another, the software flexibility of the micro-sequence provides a mechanism for various JVM optimizations now known or later developed.

Figure 2:
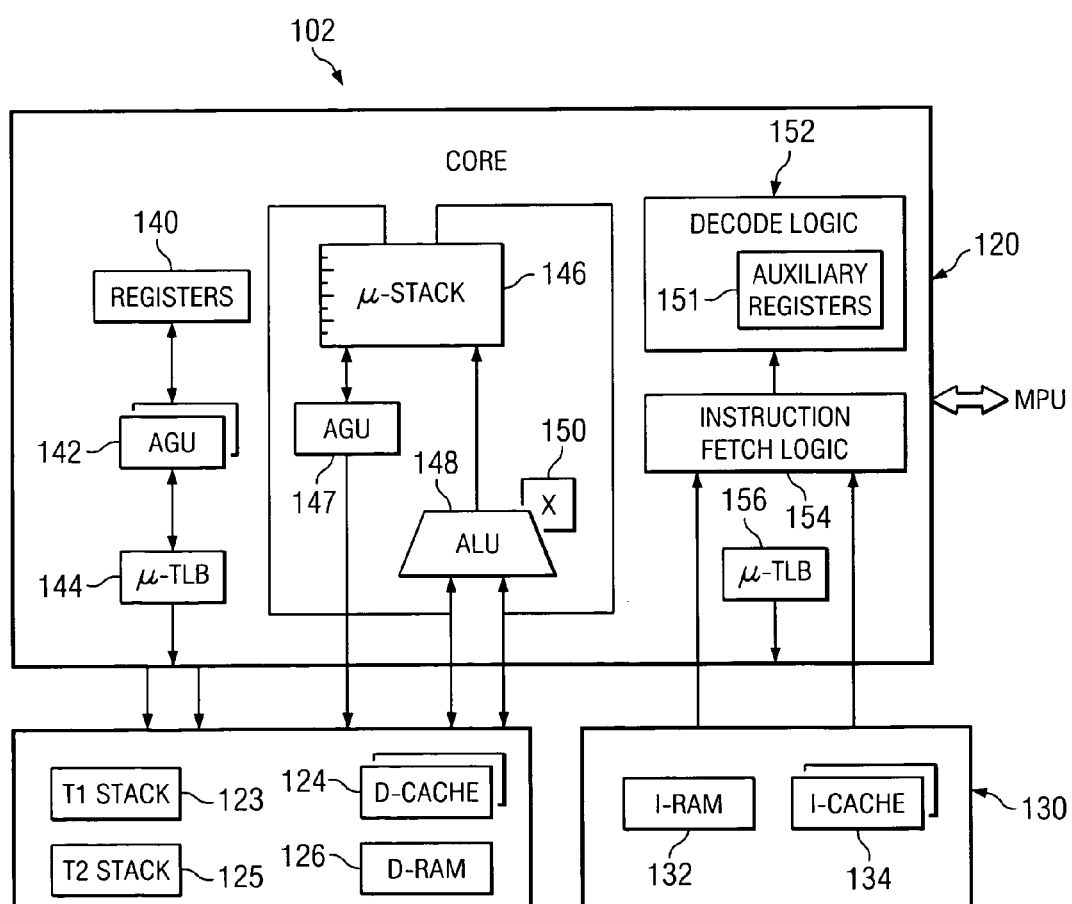
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146 and processed by the ALU 148, while instructions may be fetched from instruction storage 130 by fetch logic 154 and decoded by decode logic 152. The address generation unit 142 may be used to calculate addresses based, at least in part, on data contained in the registers 140. The AGUs 142 may calculate addresses for C-ISA instructions. The AGUs 142 may support parallel data accesses for C-ISA instructions that perform array or other types of processing. The AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 comprises auxiliary registers 151.

Figures 3, 4:
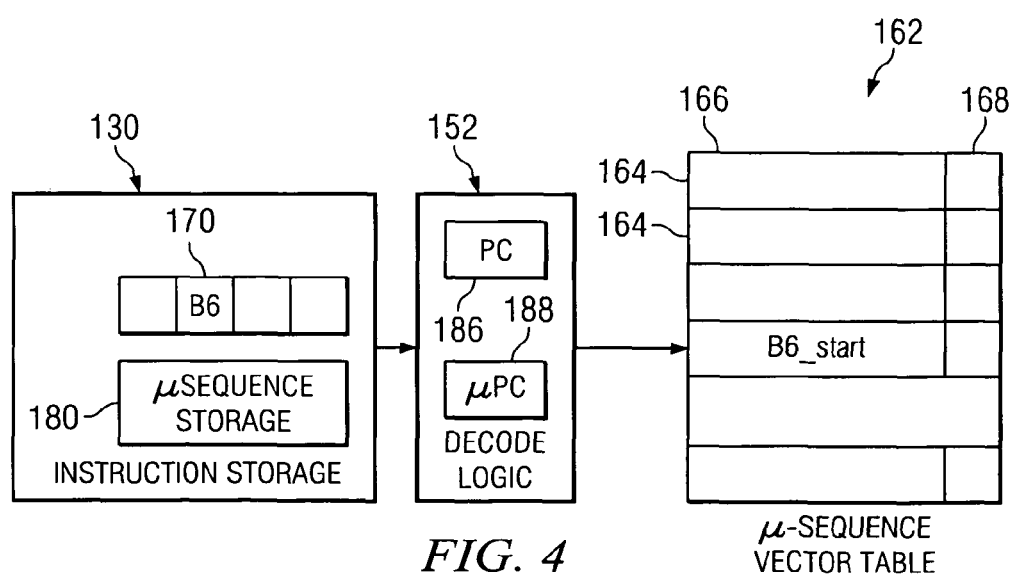
FIG. 3 shows various registers used in the JSM of FIGS. 1 and 2, in accordance with embodiments of the invention.
FIG. 4 shows the preferred operation of the JSM to include "micro-sequences," in accordance with embodiments of the invention.

Referring now to FIG. 3, the registers 140 may include 16 registers designated as R0-R15. In some embodiments, registers R0-R5 and R8-R14 may be used as general purposes ("GP") registers usable for any purpose by the programmer. Other registers, and some of the GP registers, may be used for specific functions. For example, in addition to use as a GP register, register R5 may be used to store the base address of a portion of memory in which Java local variables may be stored when used by the current Java method. The top of the micro-stack 146 can be referenced by the values in registers R6 and R7, though the scope of disclosure is not limited to using registers R6 and R7. The top of the micro-stack 146 has a matching address in external memory pointed to by register R6 or any other suitable register. The values contained in the micro-stack 146 are the latest updated values, while their corresponding values in external memory may or may not be up to date. Register R7, or any other suitable register, provides the data value stored at the top of the micro-stack 146. Register R15 may be used for status and control of the JSM 102. At least one bit (called the "Micro-Sequence-Active" bit) in status register R15 (or other suitable register) is used to indicate whether the JSM 102 is executing a simple instruction or a complex instruction through a micro-sequence. This bit controls, in particular, which program counter is used (PC or μPC) to fetch the next instruction, as will be explained below.

Referring again to FIG. 2, as noted above, the JSM 102 is adapted to process and execute instructions from at least two instruction sets, at least one having instructions from a stack-based instruction set (e.g., Java). The stack-based instruction set may include Java Bytecodes. Unless empty, Java Bytecodes may pop data from and push data onto the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("DRAM") 126. Reference may be made to U.S. Pat. No. 6,826,652, filed Jun. 9, 2000 and U.S. Pat. No. 6,792,508, filed Jun. 9, 2000, both incorporated herein by reference. Reference also may be made to U.S. Ser. No. 09/932,794 (Publication No. 20020069332), filed Aug. 17, 2001 and incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for "complex" micro-sequenced Bytecodes or micro-sequences, as described below. The I-cache 134 may be used to store other types of Java Bytecode and mixed Java/C-ISA instructions.

As noted above, the C-ISA instructions generally complement the standard Java Bytecodes. For example, the compiler 110 may scan a series of Java Bytecodes 112 and replace a complex Bytecode with a micro-sequence as explained previously. The micro-sequence may be created to optimize the function(s) performed by the replaced complex Bytecodes.

FIG. 4 illustrates the operation of the JSM 102 to replace Java Bytecodes with micro-sequences. FIG. 4 shows some, but not necessarily all, components of the JSM. In particular, the instruction storage 130, the decode logic 152, and a micro-sequence vector table 162 are shown. The decode logic 152 receives instructions from the instruction storage 130 and accesses the micro-sequence vector table 162. In general and as described above, the decode logic 152 receives instructions (e.g., instructions 170) from instruction storage 130 via instruction fetch logic 154 (FIG. 2) and decodes the instructions to determine the type of instruction for subsequent processing and execution. In accordance with the preferred embodiments, the JSM 102 either executes the Bytecode from instructions 170 or replaces a Bytecode from instructions 170 with a micro-sequence as described below.

The micro-sequence vector table 162 may be implemented in the decode logic 152 or as separate logic in the JSM 102. The micro-sequence vector table 162 preferably includes a plurality of entries 164. The entries 164 may include one entry for each Bytecode that the JSM may receive. For example, if there are a total of 256 Bytecodes, the micro-sequence vector table 162 preferably comprises at least 256 entries. Each entry 164 preferably includes at least two fields—a field 166 and an associated field 168. Field 168 may comprise a single bit that indicates whether the instruction 170 is to be directly executed or whether the associated field 166 contains a reference to a micro-sequence. For example, a bit 168 having a value of "0" ("not set") may indicate the field 166 is invalid and thus, the corresponding Bytecode from instructions 170 is directly executable by the JSM. Bit 168 having a value of "1" ("set") may indicate that the associated field 166 contains a reference to a micro-sequence.

If the bit 168 indicates the associated field 166 includes a reference to a micro-sequence, the reference may comprise the full starting address in instruction storage 130 of the micro-sequence or a part of the starting address that can be concatenated with a base address that may be programmable in the JSM. In the former case, field 166 may provide as many address bits as are required to access a portion of or all of the appropriate memory in the JSM 102. In the latter case, a register within the JSM registers 140 is programmed to hold the base address and the vector table 162 may supply only the offset to access the start of the micro-sequence. Most or all JSM internal registers 140 and any other registers preferably are accessible by the main processor unit 104 and, therefore, may be modified by the JVM as necessary. Although not required, this latter addressing technique may be preferred to reduce the number of bits needed within field 166. At least a portion 180 of the instruction 130 may be allocated for storage of micro-sequences and thus the starting address may point to a location in micro-sequence storage 130 at which a particular micro-sequence can be found. The portion 180 may be implemented in I-RAM 132 shown above in FIG. 2.

Although the micro-sequence vector table 162 may be loaded and modified in accordance with a variety of techniques, the following discussion includes a preferred technique. The vector table 162 preferably comprises a JSM resource that is addressable via a register 140. A single entry 164 or a block of entries within the vector table 162 may be loaded by information from the data cache 124 (FIG. 2). When loading multiple entries (e.g., all of the entries 164) in the table 162, a repeat loop of instructions may be executed. Prior to executing the repeat loop, a register (e.g., R0) preferably is loaded with the starting address of the block of memory containing the data to load into the table. Another register (e.g., R1) preferably is loaded with the size of the block to load into the table. Register R14, or any other suitable register, is loaded with the value that corresponds to the first entry in the vector table that is to be updated/loaded.

The repeated instruction loop preferably comprises two instructions that are repeated n times. The value n preferably is the value stored in register R1. The first instruction in the loop preferably performs a load from the start address of the block (R0) to the first entry in the vector table 162. The second instruction in the loop preferably adds an "immediate" value to the block start address. The immediate value may be "2" if each entry in the vector table is 16 bits wide. The loop repeats itself to load the desired portions of the total depending on the starting address.

In operation, the decode logic 152 uses a Bytecode from instructions 170 as an index into micro-sequence vector table 162. Once the decode logic 152 locates the indexed entry 164, the decode logic 152 examines the associated bit 168 to determine whether the Bytecode is to be replaced by a micro-sequence. If the bit 168 indicates that the Bytecode can be directly processed and executed by the JSM, then the instruction is so executed. If, however, the bit 168 indicates that the Bytecode is to be replaced by a micro-sequence, then the decode logic 152 preferably changes this instruction into a "no operation" (NOP) and sets the micro-sequence-active bit (described above) in the status register R15. In another embodiment, the JSM's pipe may be stalled to fetch and replace this micro-sequenced instruction by the first instruction of the micro-sequence. Changing the micro-sequenced Bytecode into a NOP while fetching the first instruction of the micro-sequence permits the JSM to process multi-cycle instructions that are further advanced in the pipe without additional latency. The micro-sequence-active bit may be set at any suitable time such as when the micro-sequence enters the JSM execution stage (not specifically shown).

As described above, the JSM 102 implements two program counters—the PC and the µPC. The PC and the µPC are stored in auxiliary registers 151, which in turn is stored in the decode logic 152. In accordance with a preferred embodiment, one of these two program counters is the active program counter used to fetch and decode instructions. The PC 186 may be the currently active program counter when the decode logic 152 encounters a Bytecode to be replaced by a micro-sequence. Setting the status register's micro-sequence-active bit causes the micro-program counter 188 to become the active program counter instead of the program counter 186. Also, the contents of the field 166 associated with the micro-sequenced Bytecode preferably are loaded into the µPC 188. At this point, the JSM 102 is ready to begin fetching and decoding the instructions comprising the micro-sequence. At or about the time the decode logic begins using the µPC 188, the PC 186 preferably is incremented by a suitable value to point the PC 186 to the next instruction following the Bytecode that is replaced by the micro-sequence. In at least some embodiments, the micro-sequence-active bit within the status register R15 may only be changed when the first instruction of the micro-sequence enters the execute phase of JSM 102 pipe. The switch from PC 186 to the µPC 188 preferably is effective immediately after the micro-sequenced instruction is decoded, thereby reducing the latency.

The micro-sequence may end with a predetermined value or Bytecode from the C-ISA called "RtuS" (return from micro-sequence) that indicates the end of the sequence. This C-ISA instruction causes a switch from the µPC 188 to the PC 186 upon completion of the micro-sequence. Preferably, the PC 186 previously was incremented, as discussed above, so that the value of the PC 186 points to the next instruction to be decoded. The instruction may have a delayed effect or an immediate effect depending on the embodiment that is implemented. In embodiments with an immediate effect, the switch from the µPC 188 to the PC 186 is performed immediately after the instruction is decoded and the instruction after the RtuS instruction is the instruction pointed to by the address present in the PC 186.

As discussed above, one or more Bytecodes may be replaced with a micro-sequence or a group of other instructions. Such replacement instructions may comprise any suitable instructions for the particular application and situation at hand. At least some such suitable instructions are disclosed in U.S. Ser. No. 10/631,308 (Publication No. 20040024989), filed Jul. 31, 2003 and incorporated herein by reference.

Figure 5:
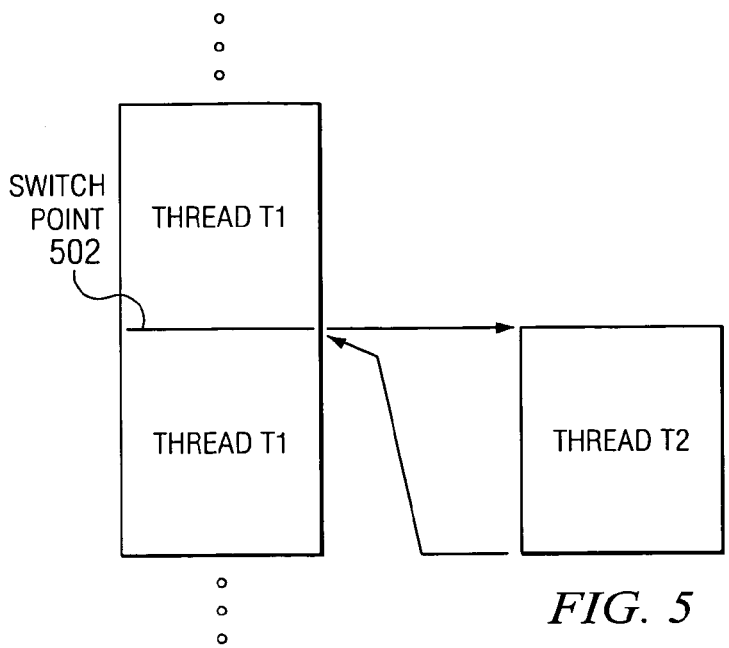
FIG. 5 shows an illustrative switching process between two execution threads, in accordance with a preferred embodiment of the invention.

Replacement micro-sequence instructions, as well as a sequence of C-ISA code in C-ISA mode, also may be used to bookmark switch points when switching code execution threads. Referring to FIG. 5, the line marked "T1" denotes a first thread T1 that is processed by the JSM 102. The thread T1 comprises a plurality of Bytecode instructions, a plurality of micro-sequence instructions, or some combination thereof. As previously explained, the instructions that are executed in thread T1 are retrieved from the instruction storage 130. More specifically, Bytecodes are retrieved from the Bytecode storage 170 and micro-sequence instructions are retrieved from micro-sequence storage 180.

While processing thread T1, the decode logic 152 may encounter a sequence of JSM instructions that causes the processing of thread T1 to be paused and the processing of a separate thread T2 to be resumed. This sequence is executed in thread T1 at or immediately prior to switch point 502. Execution of this sequence causes processing of thread T1 to stop, and processing of a separate thread T2 (denoted by line "T2") to begin in order to perform some separate task in thread T2. In some embodiments, instead of comprising a sequence of instructions (hereinafter referred to as "switch instructions") that explicitly performs a thread switch, thread T1 may comprise a sequence of instructions that may call an operating system (OS) call (e.g., threadYield ( )), which OS call selects one of a plurality of threads to execute based on thread priorities as dictated by the OS. A thread switch also may be directly initialized by the OS. Specifically, if the OS is running on the MPU 104, the OS may use a sequence of MPU commands to initialize the thread switch.

Before the JSM 102 switches from processing thread T1 to processing thread T2, however, information pertaining to the switch point 502 (i.e., "context" information) is stored by being pushed onto a T1 stack 123 (preferably a memory-based stack designated specifically for thread T1 and stored in storage 122, FIG. 2) of the JSM 102. In some embodiments, the context information may be pushed onto the micro-stack 146. Further, in preferred embodiments, the context information is a minimal amount of information, as described below.

Context information that is collected preferably comprises the values of the PC 186, µPC 188 and status register (register R15) as they are at the switch point 502. When the decode logic 152 encounters a sequence of switch instructions while processing thread T1, the sequence causes the execution of thread T1 to be halted at switch point 502, the context of switch point 502 to be saved, and the execution of thread T2 to be resumed. In some embodiments, commands sent from the MPU 104 may perform a function similar to that of a sequence of switch instructions.

Regardless of whether a switch from thread T1 to thread T2 is initialized by code in thread T1 or commands received from the MPU 104, the switching processes are similar. As described above, the execution of thread T1 is first halted. Once the JSM 102 has stopped processing thread T1, the JSM 102 is made to store the context of the switch point 502. The context of the switch point 502 preferably comprises the minimum amount of information necessary for the JSM 102 to resume processing thread T1 at switch point 502 after the JSM 102 has finished processing thread T2. The JSM 102 stores the context of the switch point 502 by retrieving the PC 186 and the µPC 188 from the auxiliary registers 151 and pushing them onto the T1 stack 123. The JSM 102 also retrieves the value of the status register R15 and pushes that value onto the T1 stack 123 as well. These three values—the PC 186, the µPC 188 and the status register R15—together comprise the minimum amount of information needed for the JSM 102 to resume processing thread T1 at switch point 502 after processing thread T2.

However, in some embodiments, it is preferable to also store a fourth value for efficiency purposes. Accordingly, the JSM 102 pushes a fourth value onto the T1 stack 123, where the fourth value is variable. For example, the fourth value may be one of the registers 140. The scope of disclosure is not limited to pushing the PC 186, µPC 188, status register and variable register onto the stack in any particular order, nor is the scope of disclosure limited to pushing these particular values onto the stack. As described above, any suitable number of values (e.g., a minimum amount of information) may be pushed onto the stack to store a context.

Figure 6:
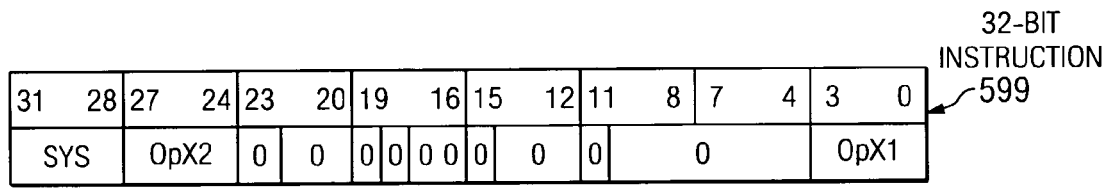
FIG. 6 shows an illustrative 32-bit instruction that may be incorporated into a micro-sequence, in accordance with a preferred embodiment of the invention.

In some embodiments, the switch instructions in the thread T1 may be 32-bit instructions that, when executed, call a subroutine or some other portion of code comprising instructions that store the context of the switch point 502 by pushing context values (e.g., PC, µPC, status register) onto the T1 stack 123. FIG. 6 shows an illustrative embodiment of such 32-bit instructions. Specifically, FIG. 6 shows a 32-bit instruction 599 that comprises information that describes the class of the 32-bit instruction 599 and further specifies the type of the instruction 599. For example, as shown in the figure, bits 31:28 describe the class of the instruction and bits 27:24 and bits 3:0 describe the particular type of instruction being used. Bits 27:24 and bits 3:0 may specify, for example, that the instruction is a minimum-context push instruction which, when executed, causes various context values to be pushed onto the stack, as described above. Bits 23:2 are not of significance and preferably do not contain arguments or other relevant data. Instead, bits 23:2 may contain placeholder values (e.g., "0" bits). The scope of disclosure is not limited to the use of instructions as shown in FIG. 6. Context values also may be pushed onto the T1 stack 123 by commands received from the MPU 104.

Each thread has its own RAM base address for storing local variables used by that thread. The micro-sequence may contain instructions that, when executed, cause the JSM 102 to clean and invalidate the DRAM 126 to save the local variables being used by thread T1. More specifically, at least some of the contents of the DRAM 126 preferably are transferred to other areas of the storage 122, such as another DRAM (not specifically shown) that may be located in the storage 122. The DRAM 126 then is invalidated to clear space in the DRAM 126 for local variables that are used by thread T2. After the DRAM 126 has been cleaned and invalidated, the JSM 102 also may push the RAM base address onto the main stack, so that the local variables used by thread T1 may be retrieved for later use. Also, because each thread pushes and pops different values onto the micro-stack 146, the JSM 102 may further clean and invalidate the micro-stack 146 in order to preserve the entries of the micro-stack 146 and to clear the micro-stack 146 for use by thread T2. In at least some embodiments, the entries of the micro-stack 146 may be copied and/or transferred to the data cache 124. Further, in some embodiments, the JSM 102 may invalidate the current entries of the micro-stack 146, so that after a thread switch, the entries loaded into the micro-stack 146 replace the invalidated entries.

After the PC 186, the µPC188, the status register R15 and an optional fourth register have been pushed onto the T1 stack 123, the JSM 102 stores the stack pointer (i.e., register R6). The stack pointer may be defined as the address of the topmost entry on T1 stack 123 and may be stored in any suitable memory (e.g., storage 122). Once at least the PC 186, µPC 188, and the status register have been pushed onto the T1 stack 123, and once the stack pointer for the T1 stack 123 has been stored in memory, the context of switch point 502 has been stored.

Because the context has been stored, the JSM 102 is ready to switch from thread T1 to thread T2. Similar to thread T1, thread T2 comprises a plurality of instructions (e.g., Bytecodes, micro-sequences or a combination thereof). Like thread T1, thread T2 may be executed multiple times. However, each time processing switches from thread T1 to thread T2, as the context of thread T1 is stored from the JSM 102 onto a stack, so should the context of thread T2 be loaded from a stack onto the JSM 102. The context of thread T2 may be found on top of the T2 stack 125. The T2 stack 125 preferably is a memory-based stack, specifically designated for thread T2 and stored in the storage 122. The thread T2 context may have been pushed onto the T2 stack 125 at the end of a previous iteration in a substantially similar fashion to the context-saving process described above in relation to thread T1, or, alternatively, the thread T2 context may have been pushed onto the T2 stack 125 during the creation of the thread T2.

Thus, to begin processing thread T2, the JSM 102 loads the stack pointer for T2 stack 125 from the storage 122 to register R6 or any other suitable register. The RAM base address is loaded from the T2 stack 125, thus loading the local variables for thread T2. The JSM 102 also loads the context of thread T2 from the T2 stack 125 onto the auxiliary registers 151 and/or the registers 140. In particular, the JSM 102 uses specific instructions to pop context values off of the T2 stack 125, where at least some of the specific instructions are indivisible. For example, a MCTXPOP instruction may be used to pop minimum context values off of the T2 stack 125. This MCTXPOP instruction, in at least some embodiments, is indivisible, mandatory for performing a context switch, and should not be preempted. In this way, the JSM 102 is initialized to the context of the previous iteration of thread T2. Thus, the JSM 102 effectively is able to resume processing where it "left off." The JSM 102 decodes and executes thread T2 in a similar fashion to thread T1.

After thread T2 has been executed, the JSM 102 may resume processing thread T1 at switch point 502. To resume processing thread T1 at switch point 502, the JSM 102 loads the context information of thread T1 from the T1 stack 123. The JSM 102 loads the stack pointer of thread T1 from the storage 122 and into register R6. The JSM 102 then pops the RAM base address off of the T1 stack 123 and uses the RAM base address to load the local variables for thread T1. The JSM 102 also pops the status value, µPC 188 and the PC 186 off of the T1 stack 123. The JSM 102 stores the status value to the register R15 and stores the µPC 188 and the PC 186 to the auxiliary registers 151. In this way, the context information that is stored on top of the T1 stack 123 is popped off the stack and is used by the JSM 102 to return to the context of switch point 502. The JSM 102 may now resume processing thread T1 at switch point 502. The thread switch from thread T2 to thread T1 may be controlled by a sequence of code being executed in thread T2 or, alternatively, by commands sent from the MPU 104. The thread switching technique described above may be applied to any suitable pair of threads in the system 100.

FIG. 7 shows a flowchart summarizing the process used to switch from one thread to another thread. The process 600 may begin by processing thread T1 (block 602). The process 600 comprises monitoring for a sequence of code in thread T1, or commands from the MPU 104, that initialize a thread switch from thread T1 to thread T2 (block 604). If no such sequence is encountered or no such command is received from the MPU 104, the process 600 comprises continuing to process thread T1 (block 602). However, if such a sequence or MPU 104 command is encountered, then the process 600 comprises halting processing of thread T1 (block 606) and pushing either the full or minimum context to the T1 stack (block 608), as previously described.

The process 600 further comprises cleaning and invalidating the RAM (block 610), pushing the RAM base address onto the T1 stack (block 612), cleaning and invalidating the micro-stack (block 614), and storing the T1 stack pointer to any suitable memory (block 616). The context of thread T1 has now been saved. Before beginning to process thread T2, the context of thread T2 (if any) is to be loaded from the T2 stack. Specifically, the process 600 comprises loading the T2 stack pointer from memory (block 618), popping the RAM base address from the T2 stack (block 620), popping the full or minimum context from the T2 stack (block 622), and subsequently beginning processing of the thread T2 (block 624).

In the embodiments described above, a minimum context (i.e., PC, µPC, status register) is pushed onto a stack to bookmark a switch point. While storing the minimum-context is faster than storing the full-context (i.e., all registers in the JSM core), in some embodiments, it may be desirable to perform a full-context store instead of a minimum-context store, for reasons previously described. Thus, in such embodiments, full contexts also may be stored and/or loaded, in which case most or all of the registers 140 as well as most or all of the auxiliary registers 151 are stored and/or loaded with each thread switch. For instance, in cases where one or more register values other than the PC 186, µPC 188, and status register are affected in a second thread, it may be desirable to store all register values via a full-context store. In such cases, the 32-bit instructions described above and shown in FIG. 6 may comprise data (e.g., in bits 31:24 and 3:0) that causes a full-context store to be performed. Similarly, a 32-bit instruction may comprise data that causes a full-context load to be performed. Further, as also described above, a full-context store and/or load may be initialized by a command from the MPU 104 instead of by code being executed in thread T1. A full-context store and/or load is performed in a similar manner to a minimum-context store and/or load, with the exception being a difference in the number of registers stored and/or loaded. In embodiments where the commands are not being used to switch threads, but instead thread T1 is performing the thread switch itself, the steps in blocks 608-622 are performed by the thread T1, and the step in block 606 preferably does not occur until the thread switch has been performed.

Figure 8:
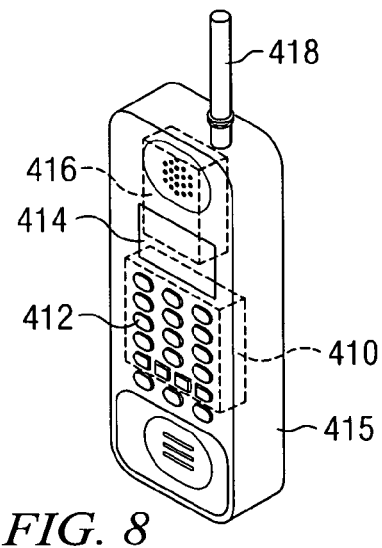
FIG. 8 shows the system described herein, in accordance with preferred embodiments of the invention.

System 100 may be implemented as a mobile cell phone 415 such as that shown in FIG. 8. As shown, the battery-operated mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. An electronic device, comprising:
a processor configured to execute a first thread and a second thread;
a memory coupled to the processor and configured to store a first stack used by the first thread,
wherein the processor is further configured to switch from execution of the first thread to execution of the second thread by halting the first thread at a switch point; and
executing a minimum context push instruction comprised in a first instruction set of the processor, wherein execution of the minimum context push instruction pushes a minimum context of the first thread onto the first stack, wherein the minimum context comprises at least a program counter and a status register; and
wherein the memory is further configured to store a second stack used by the second thread, and the processor is further configured to switch by executing a minimum context POP instruction comprised in the first instruction set of the processor, wherein execution of the minimum context pop instruction pop a minimum context of the second thread from the second stack.

2. The electronic device of claim 1, wherein the minimum context of the first thread consists of two program counters and a status register of the processor.

3. The electronic device of claim 2, wherein the two program counters are a program counter for the first instruction set of the processor and a program counter for a second instruction set of the processor.

4. The electronic device of claim 1, wherein the processor is further configured to switch by pushing a base address of local variables of the first thread onto the first stack.

5. The electronic device of claim 1, wherein the processor is further configured to switch by storing an address of a topmost stack entry of the first stack in a memory.

6. A processor configured to switch between a first thread and a second thread executable on the processor, the processor comprising:
a memory adapted to store a first stack used by the first thread; and
a decode logic adapted to decode a minimum context push instruction retrieved from the memory at a switch point in the first thread,
wherein the minimum context push instruction is in a first instruction set of the processor, and
wherein execution of the minimum context push instruction causes the processor to push onto the first stack a minimum context of the first thread, wherein the minimum context comprises at least a program counter and a status register, and
wherein the memory is further adapted to store a second stack used by the second thread, and the decode logic is further adapted to decode a minimum context pop instruction retrieved from the memory at the switch point, wherein the minimum context pop instruction is in the first instruction set of the processor, and wherein execution of the minimum context pop instruction causes the processor to pop a minimum context of the second thread from the second stack.

7. The processor of claim 6, wherein the minimum context of the first thread consists of two program counters and a status register of the processor.

8. The processor of claim 7, wherein the two program counters are a program counter for the first instruction set of the processor and a program counter for a second instruction set of the processor.

9. The processor of claim 6, wherein the decode logic is further adapted to store in a different memory an address of a topmost stack entry of the first stack.

10. A method for switching from a first thread executing on a processor to a second thread executing on the processor, the method comprising:
switching from execution of the first thread to execution of the second thread by halting the first thread at a switch point;
executing a minimum context push instruction comprised in a first instruction set of the processor, wherein execution of the minimum context push instruction pushes a minimum context of the first thread onto a first stack used by the first thread, wherein the minimum context comprises at least a program counter and a status register; and
executing a minimum context pop instruction comprised in the first instruction set of the processor, wherein execution of the minimum context pop instruction pop a minimum context of the second thread from a second stack used by the second thread.

11. The method of claim 10, further comprising pushing a base address of local variables of the first thread onto the first stack.

12. The method of claim 10, wherein the minimum context of the first thread consists of two program counters and a status register of the processor.

13. The method of claim 12, wherein the two program counters are a program counter for the first instruction set of the processor and a program counter for a second instruction set of the processor.

14. The method of claim 13, wherein the first instruction set is a stack-based instruction set and the second instruction set is a register-based instruction set.

* * * * *